United States Patent [19]
VanDenberg

[11] Patent Number: 5,915,705
[45] Date of Patent: *Jun. 29, 1999

[54] LIFT MECHANISM FOR VEHICLE SUSPENSIONS

[75] Inventor: Ervin K. VanDenberg, Massillon, Ohio

[73] Assignee: Meritor Heavy Vehicle Systems, LLC, Troy, Mich.

[*] Notice: This patent is subject to a terminal disclaimer.

[21] Appl. No.: 08/980,444

[22] Filed: Nov. 28, 1997

[51] Int. Cl.[6] .................................................. B62D 21/14
[52] U.S. Cl. ...................... 280/43.23; 280/43.17
[58] Field of Search .................................. 280/43.23, 43, 280/43.17; 180/209

[56] References Cited

U.S. PATENT DOCUMENTS

| | | | |
|---|---|---|---|
| 3,771,812 | 11/1973 | Pierce et al. | 280/124 F |
| 3,892,187 | 7/1975 | White, Jr. | 105/75 |
| 4,371,190 | 2/1983 | VanDenberg | 280/705 |
| 4,634,141 | 1/1987 | Hagan et al. | 280/704 |
| 4,729,579 | 3/1988 | Hagan et al. | 280/704 |
| 4,854,409 | 8/1989 | Hillebrand et al. | 180/24.02 |
| 5,015,004 | 5/1991 | Mitchell | 280/81.6 |
| 5,018,756 | 5/1991 | Mitchell | 280/81.6 |
| 5,505,482 | 4/1996 | VanDenberg | 280/704 |
| 5,540,454 | 7/1996 | VanDenberg | 280/704 X |
| 5,549,322 | 8/1996 | Mauri | 280/704 |
| 5,588,665 | 12/1996 | Pierce et al. | 280/704 |

*Primary Examiner*—Christopher P. Ellis

[57] ABSTRACT

A suspension system which includes at least one beam, a support spring extending between the vehicle frame and the support beam and a lift spring extending between a lift bracket welded to the beam and the vehicle frame. The support spring is precompressed by using a U-bolt and may be adjusted by increasing or decreasing the length of the U-bolt. Additionally, the spring provides a constant effective force throughout the entire path of travel of the tire-wheel assemblies attached to the axle. While the axle force provided by the spring increases, the force operates through a changing lever arm relative to the pivot point to assure that the spring force operating through the lever arm remains substantially constant throughout the path of travel of the suspension system.

1 Claim, 5 Drawing Sheets

LIFT MECHANISM FOR VEHICLE SUSPENSIONS

This application is a continuation of application Ser. No. 08/759,307 filed Dec. 2, 1996 which application is now pending.

BACKGROUND OF THE INVENTION

1. Technical Field

The invention relates generally to an improved suspension system for land vehicles. More particularly, the invention relates to trailing beam air suspension systems. Specifically, the invention relates to a lift mechanism for trailing beam air suspension systems. Specifically, the invention relates to a lift mechanism for trailing beam air suspension systems.

2. Background Information

With the advent following World War II of large load carrying capacity trucks and trailers in this country, came the need to provide add-on axles for increasing the capacity of trucks over that of the chassis-cab design which is manufactured with a limited number of axles. While add-on axles effectively increase load-carrying capacity, it was soon realized that as the number of load bearing axles increased on a given vehicle, a number of difficulties arose. Specifically, tire scuffing, loss in fuel economy and the inability to safely corner, all work problems associated with add-on type axles. Mitigation of these problems was a primary concern to the industry, which concern results in the development of the liftable axle suspension system. Such a suspension system could be selectively raised from the road surface or lowered into engagement with the road surface when needed, thereby mitigating the aforementioned problems.

The transportation of goods by trucks continues to be a primary method of moving goods from one location to another. This commercial success is due to the large volume and load-carrying capacity available in standard trailers as well as the highway system which reaches virtually every part of North America. However, in order to assure that all manufactured trailers will travel easily on existing and newly constructed highways, trailer sizes have been standardized. Specifically, regulations have been passed which limit the trailer length, width and height. In an effort to increase the volume of the trailers, trailer manufacturers routinely dimension their trailers at the legal limit.

The use of large volume trailers amplifies the need for lift axles to be positioned under the trailer as the trailers themselves are able to carry more volume, and consequently, more weight. However, the distance between the trailer body and the road surface is relatively limited, and therefore lift axle suspensions must be manufactured to simultaneously permit the tire-wheel assemblies to move into and out of engagement with the road surface, while mounted to the trailer body.

Similarly, as the need continues to grow for the inexpensive and reliable transportation of goods, so does the popularity of road-railer suspensions such that the trailer may be supported on the trailer suspension, or alternatively on a fixed height rail bogey. A rail bogey generally includes a frame which supports at least two rail car wheels rotatably mounted on an axle. The upper portion of the frame includes a latching mechanism which is complementary related to a similar latching mechanism on the underneath of the trailer such that the trailer may be raised up via a road-railer suspension, positioned over the rail bogey, and lowered into engagement with the latching mechanism thereon. The axle of the road-railer suspension is then raised out of engagement with the railroad surface, with the rail bogey providing the suspension and wheels for use on railroad tracks.

Road-railer suspensions utilize a lifting mechanism which can either be an air spring, or a mechanical spring of the leaf or coil variety. The conventional axle lifting mechanism provides one or more stressed mechanical springs acting directly between the vehicle frame and axle. When air is relieved from the air springs, the mechanical springs raise the axle. The mechanical springs, in their condition of diminished stress when the axle is fully raised, must still exert sufficient force to support the weight of the axle and associated tires such that the tires remain in the raised position. When the air springs are pressurized, the wheels are forced downwardly into ground engagement overcoming the load forces and mechanical lift spring forces. In the road-railer application, the axle is moved between three separate positions: a first ground engaging position when the road-railer suspension is operating in the highway mode, a second ground engaging position, or transfer mode, when the trailer is raised to engage a rail bogey in coupling mode, and a rail mode where the trailer is supported on a rail bogey and the tires are lifted out of ground engaging position.

The lift mechanism must support not only the weight of the axle and wheels, but something greater than that weight in order to assure that if the rail suspension should encounter an irregularity in the track surface, the suspended tire-wheel assemblies do not operate under the increased force and bounce downwardly to come into contact with the track surface and cause significant damage to the suspension system and associated trailer. Still further, the spring must be of sufficient size to assure that as the spring deflection decreases, the spring force remains sufficiently high to retain the related suspension system in the chosen position. Hooks Law requires that as spring deflection decreases, so does the force provided by that spring. Conversely, as spring deflection increases, so does the force exerted by that spring. Prior art suspensions, while presumably adequate for the purpose for which they are intended, often provide much greater force at certain loci of the suspension travel than required and a minimum of force at other positions along the suspension path of travel. As such, the spring mechanism must be manufactured larger than necessary in order to provide the minimum required force to the suspension system at all locations along the suspension system path of travel. By so doing, the lift mechanism is necessarily larger and more costly than would otherwise be required if a constant force at an appropriate level was required at all loci along the suspension system path of travel.

More particularly, Hooks Law requires that as spring deflection increases, so does the force exerted by that spring. As such, a smaller more economical lift mechanism may be utilized if the suspension system provides a relatively constant force to the suspension at all loci along the suspension system path of travel. This need is especially important when a spring lift mechanism is utilized with a trailing or leading beam type suspension which travels along an arc thereby moving not only vertically, but translating longitudinally as it moves from a ground engaging to a non-ground engaging position. Still further, the longitudinal movement of the axle is substantially increased when a trailing beam is utilized in a road-railer application given the relatively long path of travel of the axle as the suspension moves from the coupling mode, when the suspension is fully inflated, to transport mode when the suspension is fully deflated and the tire-wheel assemblies are in a non-ground engaging position.

Leading and trailing beam type suspensions include a pair of longitudinally extending beams which may be either flexible or rigid, one of which is located adjacent each of two longitudinally extending slider rails located beneath the body of the truck or trailer. These beams are pivotally connected at one end to a hanger bracket extending downwardly from the frame, with an axle extending between the beams adjacent the other end. Additionally, an air or coil spring is generally positioned intermediate each frame rail and a corresponding beam. The beam may extend forwardly or rearwardly of the pivot, thus defining a leading or trailing beam suspension respectively.

Trailing beam suspension systems have been utilized for many years as they offer roll stability and may be tailored to create a roll flexible or roll rigid suspension system and are relatively simple to manufacture and easy to install. However, prior lift mechanisms utilized with trailing beam suspension systems have been difficult to install, and relatively expensive to manufacture given that the lift mechanism must operate through a relatively large longitudinal axle translation given that the trailing beam suspension rotates through an arc about a single pivot point.

The need thus exists for a lift mechanism for a suspension system or a trailing or leading beam suspension system which provides a relatively constant force through the entire path of travel of the axle at a force sufficient to support the suspension at every location along its path of travel. Additionally, the need exists for a lift mechanism which is simple to install and easy to manufacture.

SUMMARY OF THE INVENTION

Objectives of the invention include providing a lift mechanism for a vehicle suspension system which is simple to manufacture and easy to install.

Another objective is to provide a lift mechanism for a suspension system which may be utilized with most suspension systems.

Still another objective is to provide a lift mechanism for a suspension system which utilizes a precompressed coil spring.

Still a further objective of the invention is to provide a lift mechanism for a suspension system which provides a relatively constant force along the entire path of travel of the associated axle.

Still a further objective is to provide a lift mechanism for a suspension system which may be positioned at any location radially about the lift beam without affecting the force deflection ratio.

A still further objective is to provide such a lift mechanism which is of simple construction, which achieves the stated objectives in a simple, effective and inexpensive manner, and which solves problems and satisfies needs existing in the art.

These and other objectives and advantages of the invention are obtained by the improved lift mechanism for a suspension system, the general nature of which may be stated as including a pivot having a first line of action; a suspension frame; at least one beam pivotally mounted to the suspension frame on the pivot; and a lift spring having a force, a length and a second line of action attached to the beam whereby the first line of action and the second line of action are spaced apart a first distance, and in which the first distance increases as the length of the lift spring increases, and in which the first distance decreases as the length of the lift spring decreases.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
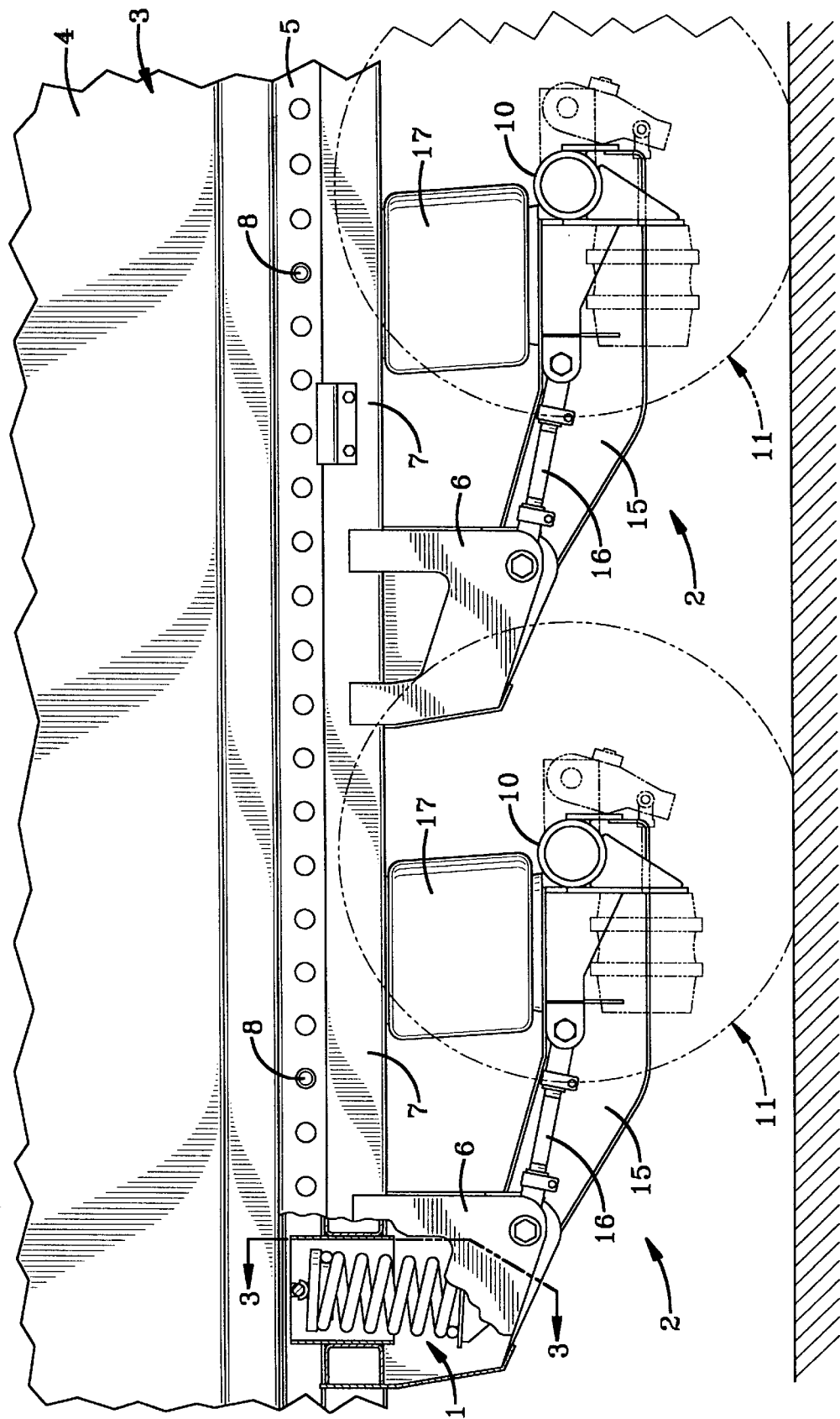
FIG. 1 is a side elevational view of the suspension system of the present invention shown attached to a vehicle and with a tire-wheel assembly shown in dot-dash lines, and with portions broken away and shown in section.
Figure 2:
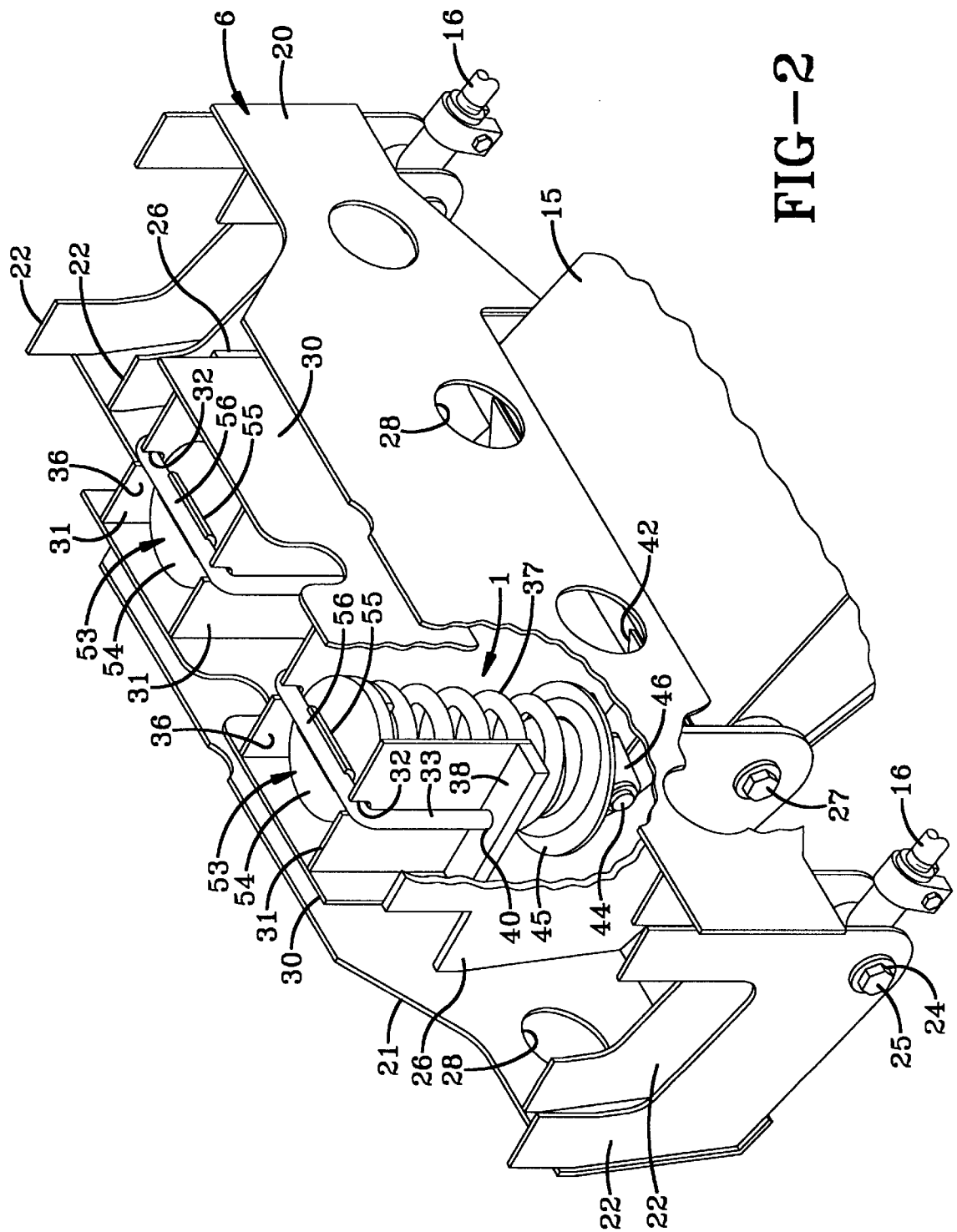
FIG. 2 is an enlarged perspective view of the suspension system shown in FIG. 1 with portions broken away.

The improved lift mechanism of the present invention is indicated generally at 1 and is particularly shown in FIGS. 1 and 2 attached to a suspension system 2. Lift mechanism 1 and suspension system 2 are shown generally in FIGS. 1 and 2, and are particularly adapted to be mounted on a vehicle 3, such as a truck or trailer. Vehicle 3 includes a cargo box 4 supported by a pair of frame rails 5 extending longitudinally beneath vehicle 3. Suspension system 2 includes a suspension frame 6 welded to a pair of slide channels 7. Slide channels 7 are spaced apart a distance equal to the distance between slider rails 5 and are mounted to slider rails 5 with a plurality of mounting pins 8. Suspension system 2 further includes an axle 10 supporting a tire-wheel assembly 11 on each end thereof. Still referring to FIG. 1, suspension system 2 includes a central beam 15 and a pair of parallel and spaced apart control arms 16. A pair of air springs 17 extend intermediate central beam 15 and slide channels 7.

Referring to FIG. 2, suspension frame 6 includes a front plate 20 and a rear plate 21 parallel to and spaced apart from front plate 20. A pair of parallel and spaced apart hanger brackets 22 are positioned intermediate front plate 20 and rear plate 21 adjacent each end thereof. Each pair of plates 22 are positioned apart a distance substantially equal to the width of slide channels 7 such that slide channels 7 may be welded thereto as shown specifically in FIG. 1. Additionally, each hanger bracket 22 is formed with an axially aligned hole 24 in the lower rear corner thereof, and one control arm 16 is mounted within holes 24 via a pivot pin 25. A pair of parallel and spaced apart pivot flanges 26 are positioned intermediate front plate 20 and rear plate 21 for pivotally supporting center beam 15 via a pivot pin 27. Each of front plate 20 and rear plate 21 are formed with a plurality of holes 28 for reducing the weight thereof.

A pair of parallel and spaced apart inner walls 30 extends between pivot flanges 26 and is welded thereto. Additionally, two pair of parallel and spaced apart cross walls 31 extend between inner walls 30 and are substantially perpendicular thereto. Each cross wall 31 is formed with a notch 32 centered along its upper edge for receiving a respective U-bolt 33 having a central rod 34 and a pair of parallel and spaced apart threaded legs 35 which extend substantially perpendicular to central rod 34. Additionally, inner walls 30 and cross walls 31 define a pair of spring boxes 36 for receiving a coil spring 37 therein. Each cross wall 31 includes a mounting flange 38 extending away from spring box 36 and formed with a hole 40. Hole 40 is sized to receive one leg 35 of a U-bolt 33.

Figure 3:
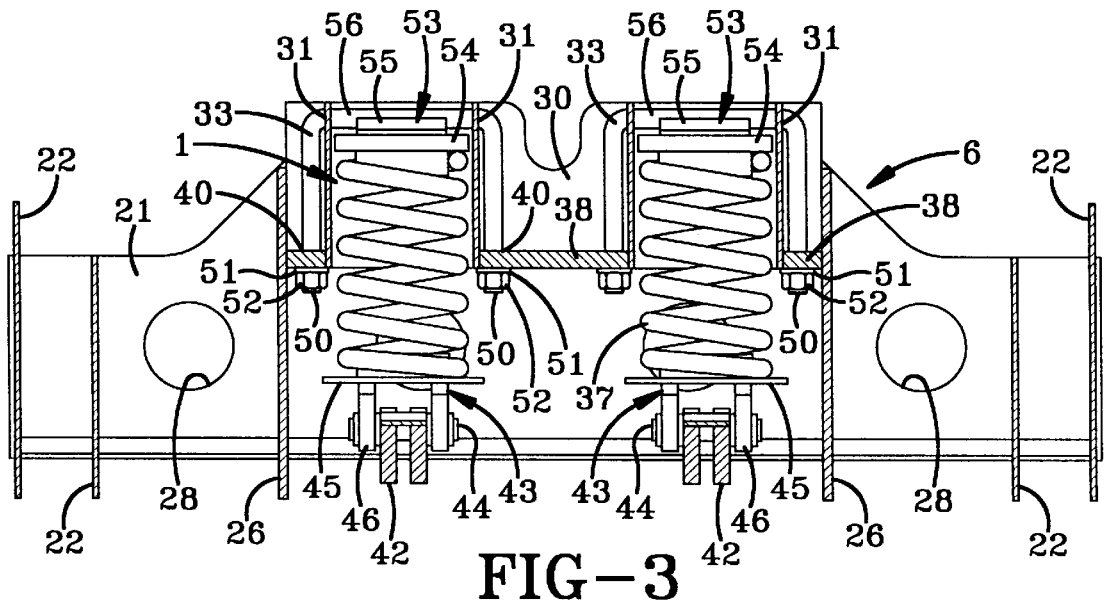
FIG. 3 is a sectional view taken along line 3—3, FIG. 1.
Figure 4:
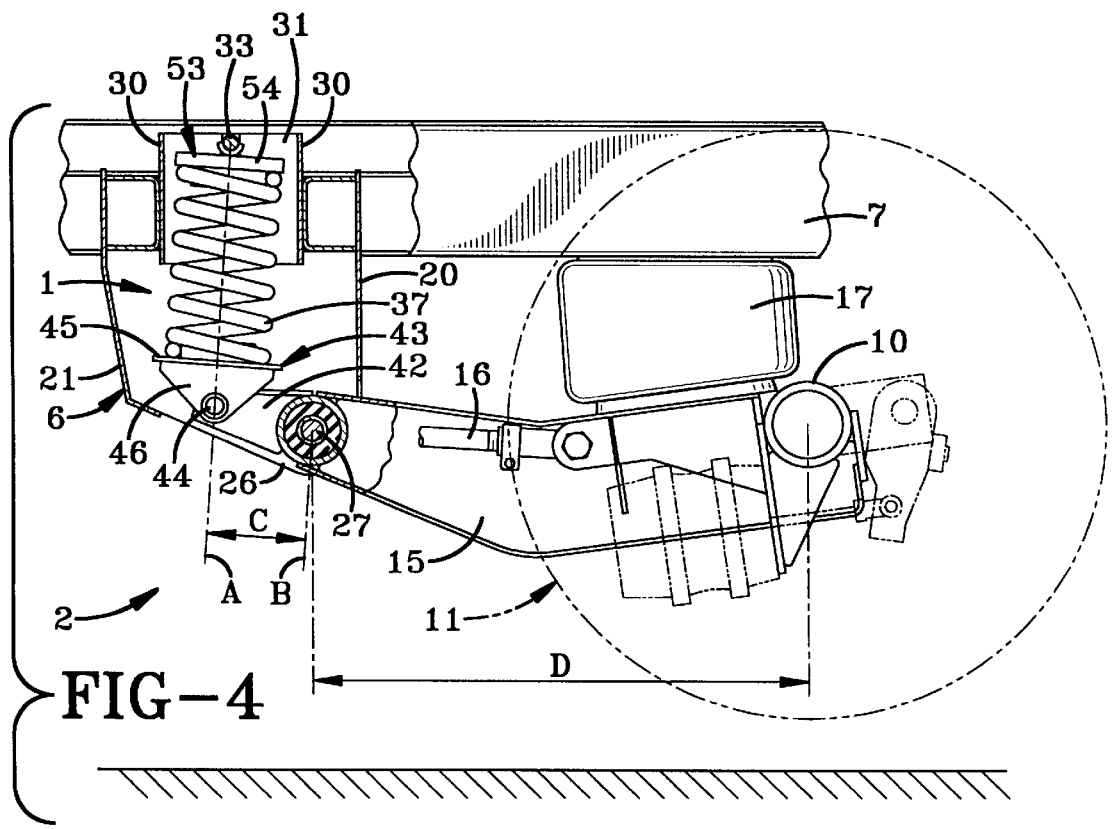
FIG. 4 is a side elevational view of the suspension system shown in FIG. 1 in transfer mode and with portions broken away and in section.

Referring to FIGS. 2–4, a lift bracket 42 extends forward of central beam 15 having a lift bracket or weldment 43 pivotally attached thereto via a mounting bolt 44. Lift weldment 43 includes a spring plate 45 and a pair of downwardly extending mounting flanges 46 and a pair of parallel and spaced apart downwardly extending mounting flanges 46 welded thereto. Pivot bolt 44 extends through mounting flanges 46 to provide pivotal movement between lift bracket 42 and lift weldment 43. Still further, coil spring 37 is positioned within spring box 36 and on top of spring plate 45 of lift weldment 43.

Each U-bolt 33 extends over a pair of cross walls 31 and is supported within associated notches 32. The ends 50 of legs 35 of each U-bolt 33 are threaded and extend through holes 40 formed in mounting flanges 38. Each threaded end 50 receives a lock washer 51 and a nut 52. Nut 52 is tightened to compress coil spring 37 to provide a preselected strength in accordance with Hooks Law. Further, a top weldment 53 is positioned on top of each coil spring 37 and intermediate coil spring 37 and U-bolt 33 and provides a force plate 54 and a bolt receiver 55 complementary shaped to a horizontal portion 56 of U-bolt 33. More particularly, bolt receiver 55 provides an upwardly arcuate section complementary shaped to the exterior of horizontal portion 56 of U-bolt 33 which is centrally positioned on force plate 54 to provide a constant downward force onto U-spring 37. As can be seen from a review of FIGS. 3–4, nuts 52 may be tightened along ends 50 of U-bolts 33 in order to increase the deflection of coil spring 37 thereby assuring that coil springs 37 provide an increased moment on central beam 15. Alternatively, nuts 52 may be moved downwardly along threaded ends 50 of U-bolt 33 in order to decrease the moment applied to lift bracket 42 and consequently to central beam 15 without departing from the spirit of the present invention, and in order to provide a simple adjustment to the force applied by coil springs 37.

Lift mechanism 1 is shown with a central beam suspension system 2, however, it should be understood from a review of FIGS. 1–4, lift mechanism 1 may be utilized with a traditional trailing beam type suspension without departing from the spirit of the present invention.

Referring specifically to FIG. 4, suspension system 2 includes a first line of action A which passes through the center of coil spring 37 and directly through mounting bolt 44, and a second line of action B extending directly through pivot pin 27. First line of action A and second line of action B are spaced apart by a distance C which, in the preferred embodiment, is substantially equal to the length of lift bracket 42. Still further, axle 10 is spaced apart from pivot pin 27 and consequently from second line of action B a distance indicated at D in FIG. 4. Axle 10 and the associated tire-wheel assemblies are acted upon by gravity such that the effective weight of axle 10 relative to the second line of action B equals the weight of axle 10, and the associated tire-wheel assemblies acting through lever arm, or distance D. Similarly, spring 37 provides an effective force which may be defined as the force provided by coil spring 37 acting through lever arm, or distance C. As can be seen from a review of FIG. 4, when moments are summed about pivot pin 27, the effective force of spring 37 must equal the effective weight of axle 10 for suspension system 2 to remain in a static position. More particularly, the force exerted by spring 37, when multiplied through lever arm or distance C provides a moment which must equal the weight of axle 10 and the tire-wheel assemblies mounted thereon multiplied by lever arm, or distance D. When the effective force of spring 37 is equal to the effective weight of axle 10, suspension system 2 will remain static. However, when suspension system 2 and tire-wheel assemblies 11 are in the raised position as shown in FIG. 4, the effective force of spring 37 must be greater than the effective weight of axle 10 as spring 37 must retain suspension system 2 in the raised position even when abrupt downward force is applied to suspension system 2, such as, for example, when vehicle 3 rides over a bump in a rail track, or when other tire-wheel assemblies attached to vehicle 3 travel over a depression in the road surface. As such, while suspension system 2 weighs in the range of from 1200 to 1600 pounds, spring 37 provides an effective force in the range of from 1600 to 2500 pounds, and more particularly in the range of from 1900 to 2300 pounds, and more specifically spring 37 provides a constant effective force throughout the entire path of travel of tire-wheel assembly 11 of approximately 2100 pounds.

As should also be apparent from a review of FIG. 4, as spring 37 is compressed, by increasing the stored potential energy within spring 37 in accordance with Hooks Law, lever arm C or the distance between the line of action of spring 37 A and the line of action of pivot bolt 27 B decreases. Conversely, as spring 37 moves from a deflected to a non-deflected position, lever arm, or distance C increases. In essence, spring 37 is so positioned that as the potential energy stored within spring 37 and therefore such that spring 37 may provide an increased force, lever arm C decreases to compensate for the increase in force provided by spring 37. Similarly, as the amount of force exerted by spring 37 decreases in accordance with Hooks Law as the percentage of deflection of spring 37 decreases, lever arm C is larger such that the smaller force acts through a greater distance about pivot pin 27 in order to keep the effective force about pivot pin 27 relatively constant. In essence, the force exerted by spring 37 is inversely proportional as the decrease in the length of lever arm or distance C such that the moment applied about pivot pin 27 by spring 37 remains relatively constant along the entire arc or path of travel of tire-wheel assemblies 11.

Figure 5:
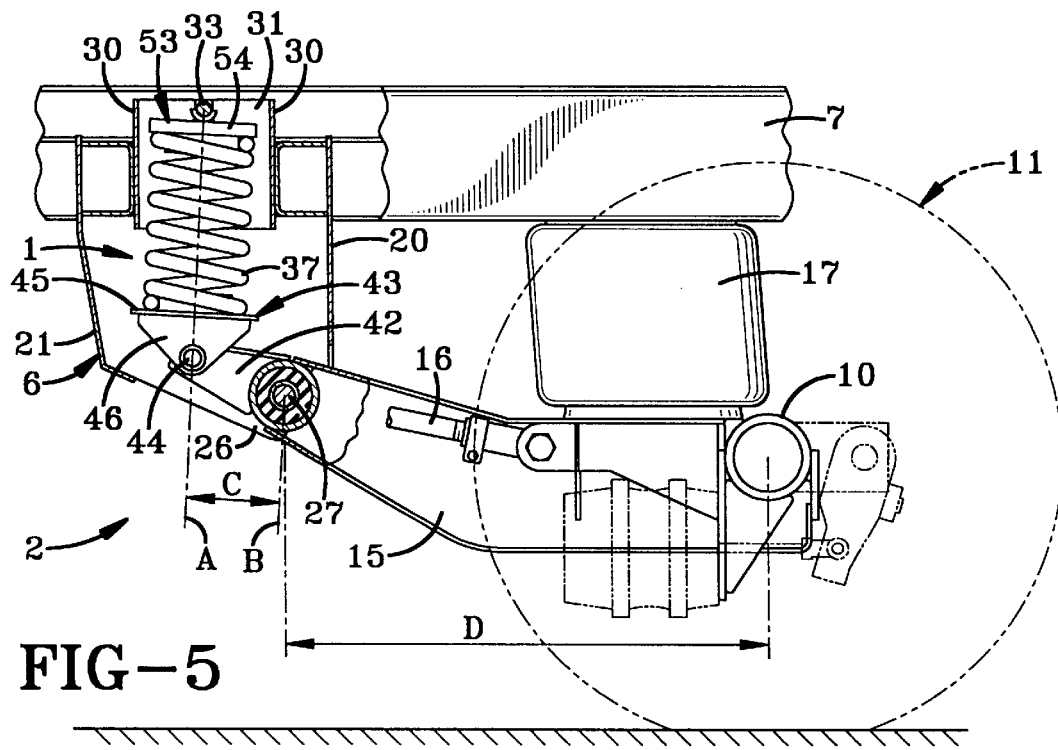
FIG. 5 is a side elevational view of the suspension system shown in FIG. 1 in highway mode and with portions broken away and in section.

Conversely, as the tire-wheel assembly moves from the non-ground engaging position shown in FIG. 4 to the ground engaging position shown in FIG. 5, distance A decreases as axle 10 translates longitudinally as it passes through an arc.

A similar relationship exists between the force exerted by spring 37 and the lever arm through which the weight of axle 10 and tire-wheel assemblies 11 act relative to pivot pin 27. Specifically, as the deflection of spring 37 increases, the distance D between axle 10 and pivot pin 27 decreases. The weight of axle 10 and tire-wheel assembles 11 thus operate through a smaller lever arm relative to pivot pin 27. Still further, as spring 37 relaxes and lever arm C increases, so does distance D between pivot pin 27 and axle 10. Referring to FIG. 4 then, when tire-wheel assembly 11 is in the fully raised position, spring 37 remains precompressed to provide a downward force onto lift bracket 42 through a distance C. Similarly, the weight of axle 10 operates under gravity through a distance D relative to pivot pin 27 such that the force provided by spring 37 acting through distance C is greater than the weight of axle 10 acting through distance D.

When tire-wheel assemblies 11 are moved to the position shown in FIG. 5, spring 37 is compressed when compared to the position shown in FIG. 4, and, similarly, distance C has been substantially decreased such that the increased force of spring 37 operates through a smaller lever arm C thereby assuring that the force operating through distance C is substantially equal in both FIGS. 4 and 5. However, distance C does not decrease at a rate exactly proportional to the increase in the force of spring 37 which difference is compensated for by the fact that axle 10 operates through a smaller distance D relative to pivot pin 27 thereby assuring that spring 17 needs only the same force, and not more force to keep tire-wheel assemblies 11 in the ground engaging position.

Figure 6:
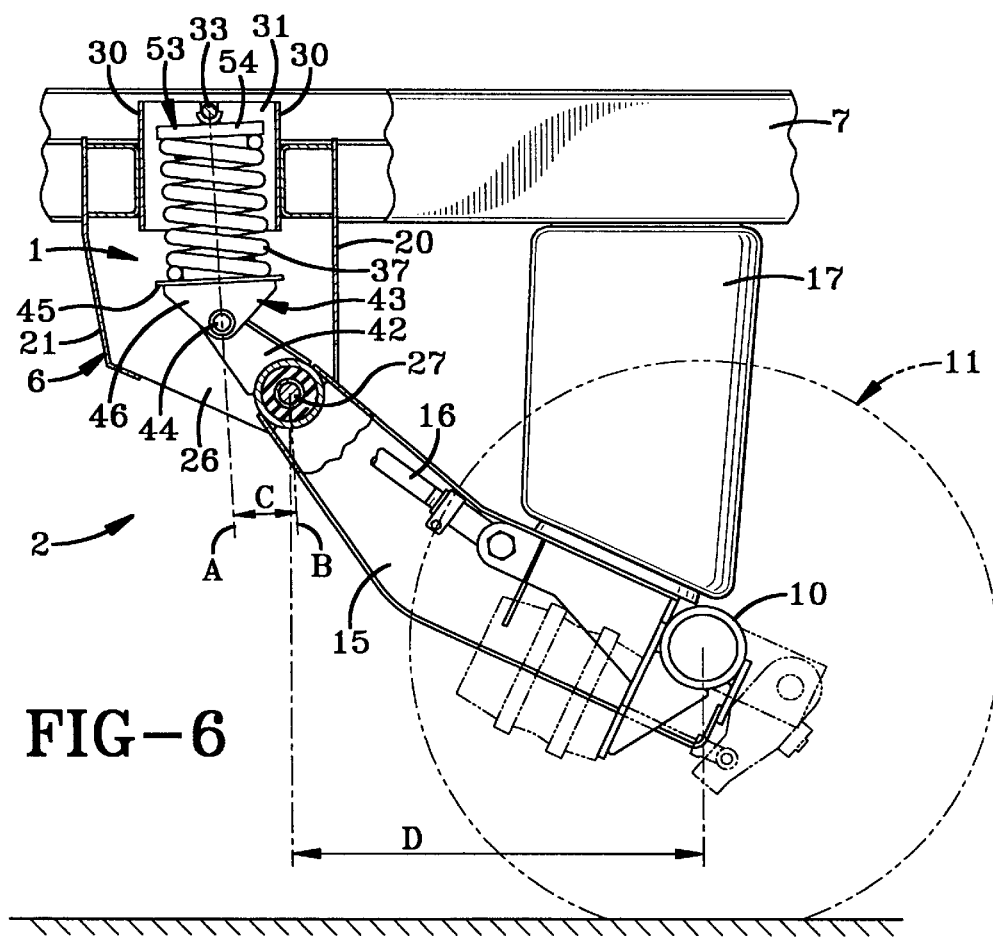
FIG. 6 is a side elevational view of the suspension system shown in FIG. 1 in transfer mode and with portions broken away and in section.
Figure 7:
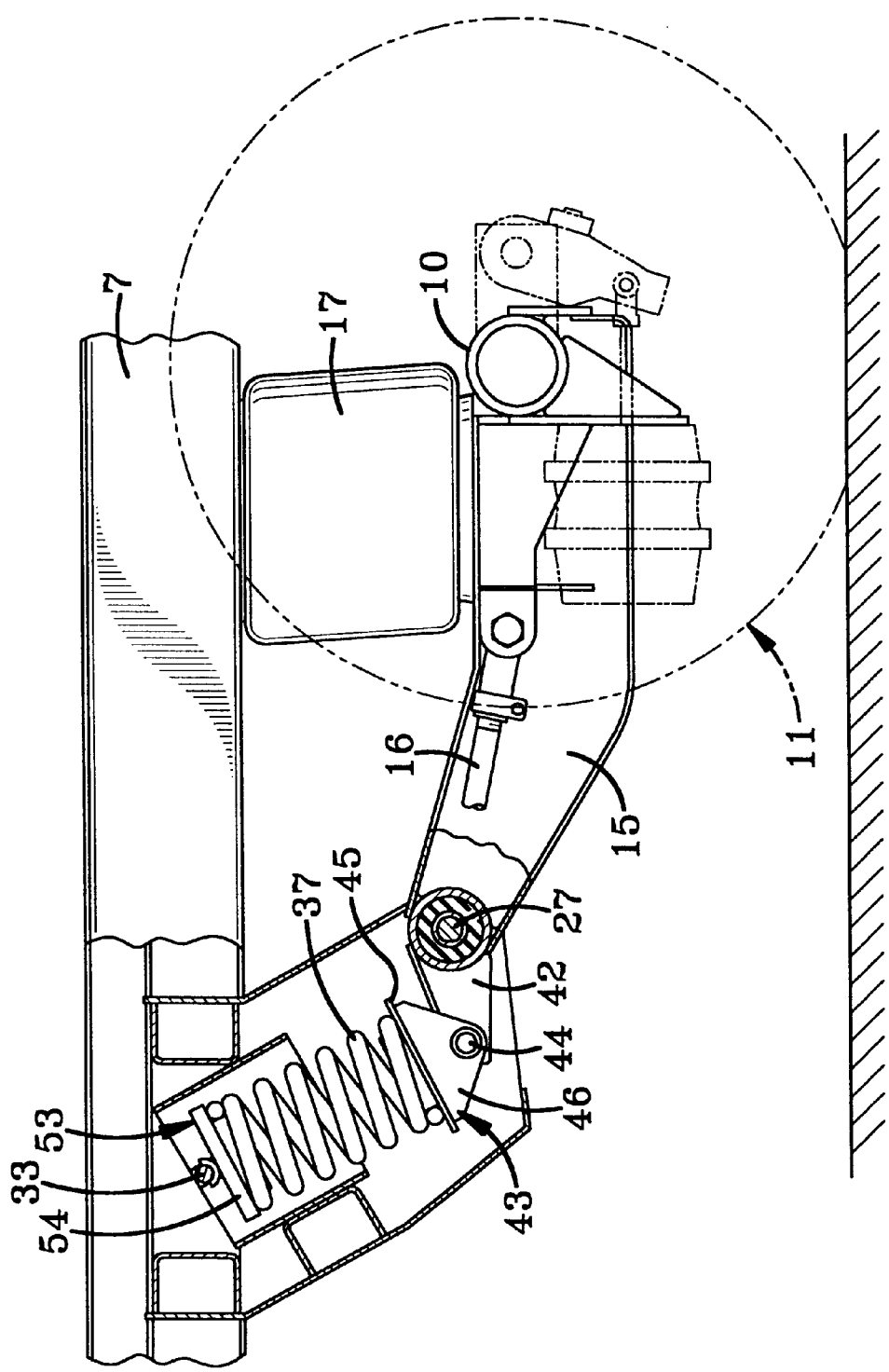
FIG. 7 is a side elevational view of the suspension system shown in FIG. 1 with portions broken away and in section and with the lift mechanism rotated radially relative to the central pivot.

Still further, when the suspension system is in coupling mode as shown in FIG. 6, spring 37 is nearly fully compressed and both distances C and D are relatively small. Inasmuch as the force provided by spring 37 is very large when suspension system 2 is in the position shown in FIG. 6, it need only operate through a small lever arm C to provide sufficient force to keep axle 10 operating through a small distance D in the coupling mode.

As can be seen from a review of FIGS. 4, 5 and 6, the effective force of spring 37 is substantially constant throughout the path of travel of tire-wheel assemblies 11 given that distances C and D decrease as the force exerted by spring 37 in accordance with Hooks Law increases. The present invention thus provides a method for providing a relatively constant force for moving an axle between a ground engaging and a non-ground engaging position by providing a coil spring which operates in accordance with Hooks Law by providing additional force as the spring is deflected, but assuring that the suspension system is manufactured to provide a smaller lever arm through which the increased force operates such that the smaller lever arm compensates for the increased force with a net result that the lift mechanism provides a relatively constant force to the suspension system throughout the path of travel of the tire-wheel assemblies. Still further, the suspension system provides a U-bolt for retaining the spring in a precompressed position which is simple to install, and easy to adjust.

Accordingly, the improved lift mechanism for vehicle suspensions is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved lift mechanism for vehicle suspensions is constructed and used, the characteristics of the construction, and the advantageous, new and useful results obtained; the new and useful structures, devices, elements, arrangements, parts and combinations, are set forth in the appended claims.

I claim:

1. A suspension system for use on a vehicle having a frame comprising:

a pivot having a first line of action;

a suspension frame;

at least one beam pivotally mounted to the suspension frame on the pivot; and a lift spring having a force, a length and a second line of action attached to the beam whereby the first line of action and the second line of action are spaced apart a first distance, and in which the first distance increases as the length of the lift spring increases, and in which the first distance decreases as the length of the lift spring decreases.

* * * * *